Nov. 18, 1969  R. M. WILMOTTE  3,479,494
INFORMATION PROCESSING AND DISPLAY WITH OPTICAL CORRELATION
Filed Dec. 12, 1963  2 Sheets-Sheet 1
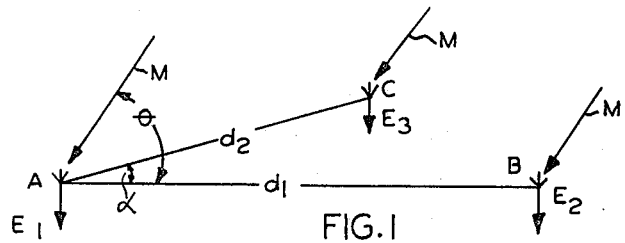
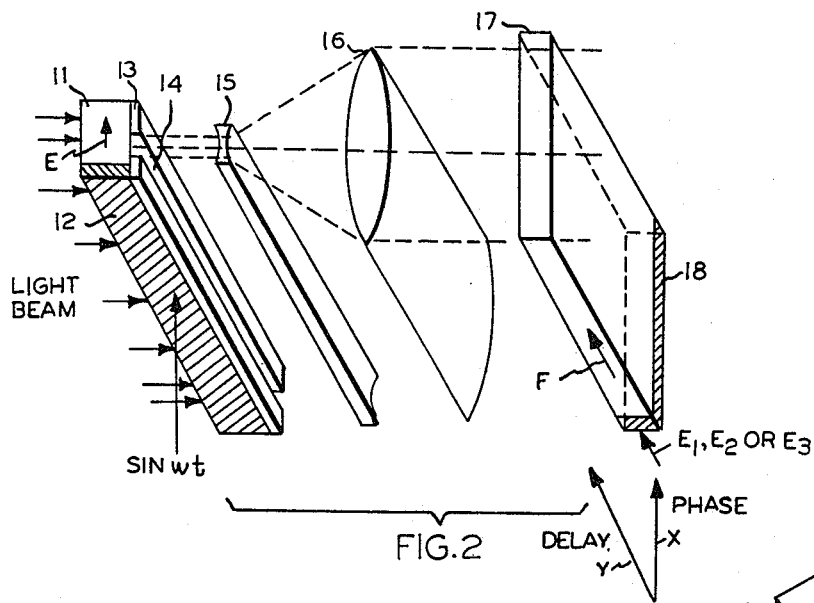
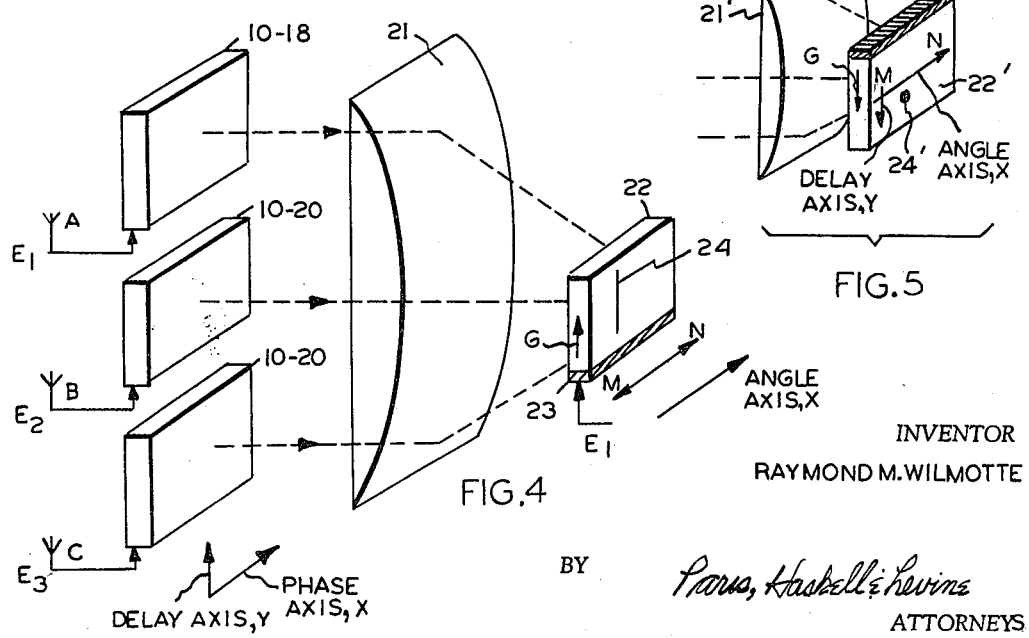
INVENTOR
RAYMOND M. WILMOTTE
BY
Paris, Haskell & Levine
ATTORNEYS United States Patent Office 3,479,494
Patented Nov. 18, 1969

3,479,494
**INFORMATION PROCESSING AND DISPLAY
WITH OPTICAL CORRELATION**
Raymond M. Wilmotte, 4301 Massachusetts Ave. NW.,
Washington, D.C. 20016
Filed Dec. 12, 1963, Ser. No. 330,158
Int. Cl. G06f *15/34;* G06g *7/19*
U.S. Cl. 235—181                              12 Claims

ABSTRACT OF THE DISCLOSURE

An optical correlation technique is disclosed. A plurality of signals are each converted into separate modulated light patterns. These optical patterns are then superimposed and optically correlated with a signal. The correlation output denotes areas of correlation between all the signals and affords a spatial indication of a parameter of the signals. The technique may be employed, for example, to derive bearing information from an antenna array in a radar system.

---

The present invention is concerned with the electro-optical processing of information. Electrical signals can be converted into sonic energy of corresponding waveform by means of electrosonic transducers, such as piezoelectric and magnetostrictive transducers, and the resultant sonic energy can be coupled into a transparent, birefractive, ultrasonic delay line such as quartz, and caused to travel along the delay line. Because of the birefractive property of the delay line, the stresses induced in the delay line by the sonic energy can be utilized to modulate or modify a beam of light directed through the delay line transversely to the line of travel of the sonic energy therein.

The present invention utilizes this technique of light modulation for the purpose of analyzing multiple parameters embodied in electrical information, and presenting these parameters in a two dimensional display capable of defining two aspects of the information simultaneously. Additionally, the present invention contemplates the processing of multiple electrical signals, in analyzing them individually by said light modulation technique, and then combining the modulated light outputs additively to derive information embodied in the relationship of the multiple signals. The present invention further contemplates the analysis of information by said light modulation technique, wherein one aspect of the information is embodied in the phase relationship of a number of signals.

In order to illustrate and explain this invention, it is described with reference to its application to radar, although it will be understood that the selection of radar is only illustrative and the invention is not limited to that application. The two principal facets of information obtained by radar are the direction or bearing of a target or object and its distance or range from some reference point, usually the radar antenna. Range information is embodied in the time between transmission of a radar signal and reception of its echo from the target. Bearing information may be obtained by physical scanning with a directional antenna, or by utilization of a number of non-directional antenna elements arranged in a known physical relationship and analyzing the phase relationships of the echo signal as received at the several antenna elements. In its radar embodiment, the illustration of the present invention utilizes the latter approach to obtain bearing information. Recordingly, it is concerned with light modulation analysis of the echo signals received at a plurality of antenna elements, to obtain by their phase relationships the bearing of the target. Additionally, the present invention combines in the analysis the time between transmission and reception of the radar signal to derive the target-range. The combined bearing and range information is presented in a single two dimensional optical display—one dimension defining the range, and the other dimension defining the bearing.

To the extent that one is concerned with signal phase analysis, as is the case with the present radar embodiment of the invention, it becomes necessary to preserve the fine structure of the waveform as well as the envelope or modulation (i.e., both in instantaneous frequency and amplitude components of the signal) during the light modulation operations. This can be accomplished with the use of transparent, solid, birefractive, ultrasonic delay lines as the light modulating elements.

Considering in its general aspects the application of the present invention to radar, utilization is made of a first set of light modulators employing transparent, solid, birefractive, ultasonic delay lines having substantial width dimensions as well as length dimensions. The length dimension is used as the time axis of the delay line, which provides the target range aspect, and the width dimension is utilized as a phase axis to define the target bearing aspect. A phase scale is established along the phase axis by means of a phase modulated light source in which the phase varies, preferably linearly along this axis. The reflected or echo signal as received at each of a plurality of spatially arranged antenna elements is applied to a respective delay line and used to further modulate the phase modulated light source. For a given direction the phase of the signal received at an antenna element will be a function of its location in the antenna ensemble. The phase scale for each element is adjusted to accordingly relate or compensate for the relative physical relationship of antenna elements in the optical system of light modulators. One mode of accomplishing this result is for example by the use of appropriate optical compensating lenses or refractors with the delay lines, to place all modulator systems on the same angular scale, the phase axis thus becoming an angle axis. Thus, when the light outputs of the several modulator systems are additively superposed and correlated with a reference signal (e.g., one of the received signals), one obtains a maximum light output along the angle axis corresponding to and indicating the bearing of the target. And if said additively superposed light outputs are correlated along the time axis with the transmitted signal as the reference signal, one simultaneously obtains the range of the target by the position along said axis at which correlation occurs. The resultant two dimensional time and phase axes display can indicate any number of targets, designating the range and bearing of each.

It is accordingly one object of the present invention to provide for light modulation analysis of two parameters of information simultaneously.

Another object of the present invention is to provide for light modulation analysis of two parameters of information, and the simultaneous presentation thereof in a two-dimensional display.

Still another object of the present invention is to provide for such analysis and presentation by utilizing phase characteristics of an information signal for one of said two dimensions and time characteristics for the other dimensions.

A still further object of the present invention is to provide for the analysis of information by light modulation techniques, utilizing additive combinations of the light modulations to determine informational parameters.

Another object of the present invention is to provide for the analysis of information by light modulation techniques, utilizing the phase relationships of a plurality of signals to determine an informational parameter.

An additional object of the present invention is to apply the foregoing techniques to radar for the determination and display of target bearing.

And another object of the present invention is to apply the foregoing techniques to radar for the simultaneous determination and display of target bearing and range.

Other objects and advantages of the present invention will become apparent to those skilled in the art from a consideration of the following detailed description of one embodiment of the invention, had in conjunction with the accompanying drawings, wherein like reference characters identify like or corresponding parts, and wherein:

FIG. 1 is a schematic representation of a radar receiving antenna array utilized to illustrate the operations of the invention in one environment;

FIG. 2 shows a portion of one embodiment of the invention effecting a first light modulation operation;

FIG. 4 is a schematic showing of the processing of the light outputs resulting from FIGS. 2 and 3; and FIG. 5 is a schematic showing of a modified processing of the light outputs resulting from FIGS. 2 and 3.

Figure 3:
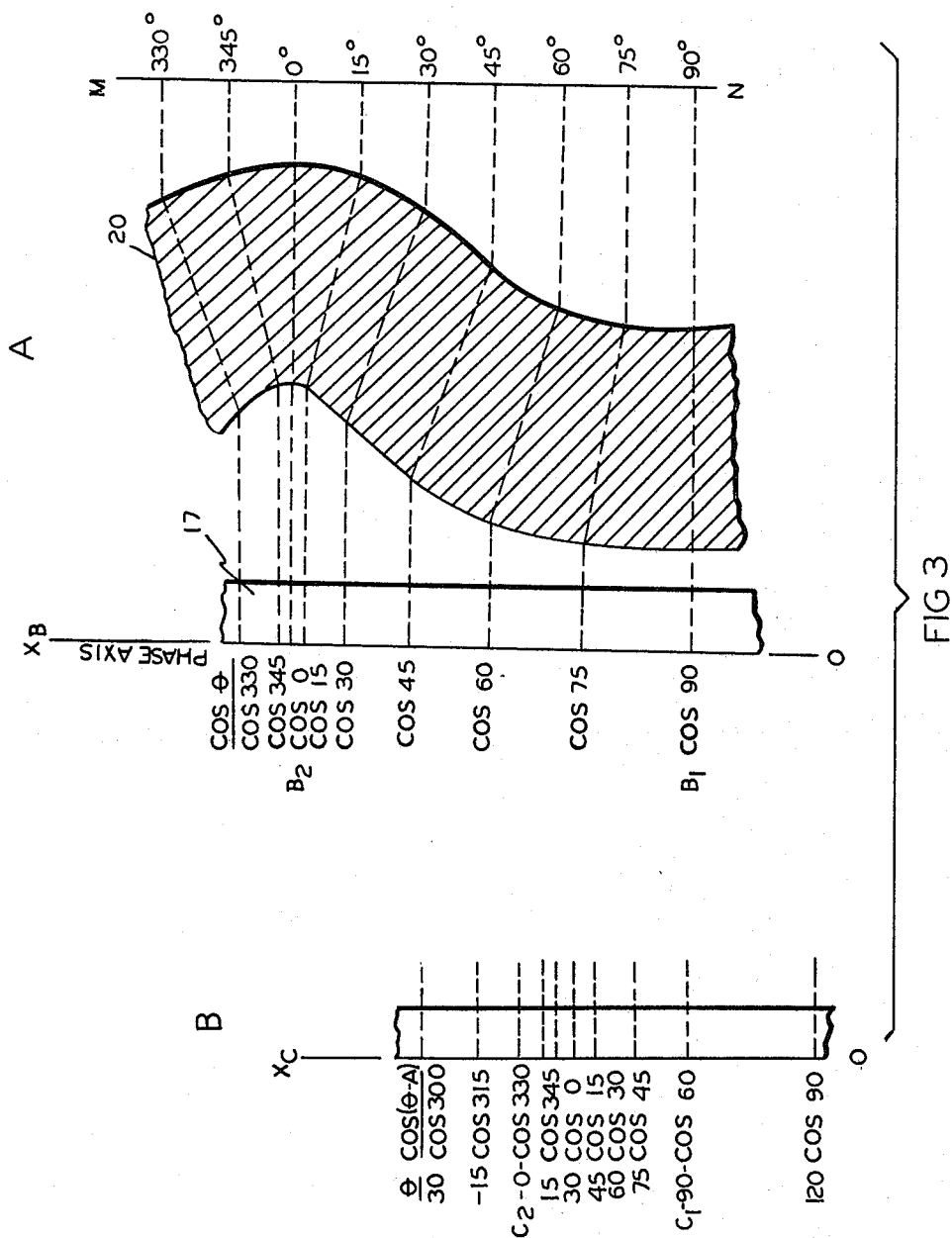
FIG. 3 is a combined schematic and graphical illustration of the light processing function following the portion of the embodiment of FIG. 2.

The application of the present invention to radar is illustrated by reference to an exemplary radar antenna array in FIG. 1, embodying the three nondirectional receiving elements A, B, and C. A particular target reflected signal is represented by the three arrows M. It is apparent that the phase relationship of signals received at the three antenna elements is dependent upon the selected fixed geometry of the array and is a function of the direction of reception of the signal. Selecting antenna element A as the origin, this relationship is dependent upon the distance $d_1$ between elements A and B, the distance $d_2$ between elements A and C, the angle $\alpha$ between lines $d_1$ and $d_2$, and the angle $\theta$ between line $d_1$ and the angle of incidence of the reflected energy M. Accordingly, the signal received by element B leads that received by element A by a phase difference $$\phi_1 = \frac{2\pi d_1 \cos \theta}{\lambda} \quad (1)$$

and that received at element C leads that at element A by $$\phi_2 = \frac{2\pi d_2 \cos (\theta - \alpha)}{\lambda} \quad (2)$$

If the signals $E_1$, $E_2$ and $E_3$ derived respectively from antenna elements A, B and C are additively combined, the maximum signal will of course be obtained when all three signals are brought into phase. Accordingly, by such a phase search the values of $\phi_1$ and $\phi_2$ can be obtained, whereupon Equations 1 and 2 can be solved for $\theta$, giving the bearing of the target. The present invention is in part concerned with effecting this phase search and mathematical solution.

To this end, all the signals received at each antenna element are converted to the same IF, care being taken that the phase shift in the receiving equipment is the same for all the antenna elements. In order to increase the signal-to-noise ratio, it is preferable to pass the signal at each antenna element through a matched filter, as for example is disclosed in my copending application Ser. No. 158,928, filed Nov. 21, 1961, and entitled Instantaneous and Continuous Analyzer. Since the present analysis is dependent on signal phase, it is apparent that such matched filter must retain the fine structure of the signal in accordance with the teachings set forth in said copending application.

In order to derive the phase relationship between the signals $E_1$, $E_2$ and $E_3$, a phase reference scale is established by a light modulator system as illustrated in FIG. 2. A phase reference is established along a phase axis X by providing a modulated light beam in which the phase varies along said X axis. This may be accomplished by utilizing a light modulator embodied in an elongate solid, birefractive, ultrasonic delay line 11, having a corresponding elongate collimated light beam 10 directed transversely therethrough, as indicated in FIG. 2. The delay line 11 is provided along one lengthwise side with an electrosonic transducer 12, e.g., a piezoelectric crystal transducer. A sine wave signal is applied to the transducer 12, causing a sonic energy sinusoidal waveform to be coupled into and to travel across the delay line 11 in the direction of arrow E, which is parallel with the selected phase axis X. A sonic energy absorber (not shown) is positioned along the side of the delay line 11 opposite the input transducer 12, to absorb the energy as it completes its traverse across the delay line to prevent reflections back through the line. Because of the birefractive qualities of the delay line, the light beam 10 is thus modulated sinusoidally along the phase axis X as it passes through the delay line. An optical mask 13 is positioned at the light output side of the delay line, providing a narrow transmission slot 14 of selected width. There is thus provided a continuous change of phase along the X-axis, covering any desired range of phase as determined by the width of the slot 14. This range may include 360° of phase, or a greater or lesser amount as desired.

This phase modulated light output of beam 10 is then expanded along the X-axis by an optical system represented here by concave lens 15, and again collimated by convex lens 16, and passed transversely through the solid, birefractive, ultrasonic delay line 17. Delay line 17 is provided with an electrosonic transducer 18 at one end, whereby electrical signals applied thereto are coupled into the delay line 17 as corresponding sonic waveforms, and caused to traverse the delay line 17 in the direction of the arrow F, which is along the time or delay axis Y. A sonic energy absorber (not shown) is located along the side of delay line 17 opposite from transducer 18 to absorb the sonic waves as they reach this end of the line.

The electrical input to transducer 18 is one of the received IF signals $E_1$, $E_2$ or $E_3$, with a complete phase scale modulator system as shown in FIG. 2 (elements 11–18) being provided for each of these signals. In order to convert the light output from the delay line 17 of each of the three. FIG. 2 phase scale modulators to the same linear angular scale along the phase axis X, these light outputs are appropriately refracted to convert the phase scale and in effect compensate for the phase differences at the antenna elements A, B, and C for all target angles $\theta$. This refraction or scale conversion thus constitutes an optical compensation for the geometric configuration of the antenna array, and therefore the refractors are designed for the specific antenna array.

Using antenna element A as the reference, as in FIG. 1, no phase converting refractor is utilized in the light output path of its associated phase scale modulator. However, the phase scale of the modulators for antenna elements B and C must be converted in accordance with the function $\cos \theta$ for element B (Equation 1), and $\cos (\theta - \alpha)$ for element C (Equation 2). A phase scale converter for element B is shown in FIG. 3, part A. Relating FIG. 3, part A, to FIG. 2, the delay line 17 orientation is such that the phase axis indicated by $OX_B$ in FIG. 3 is the phase axis X in FIG. 2, and the direction of signal travel in the delay line corresponding to arrow F in FIG. 2 is out of the plane of the paper in FIG. 3. Refractor element 20 in FIG. 3, part A, is not shown in FIG. 2, but it is located following the delay line 17 in the light path emergent from delay line 17. Refractor 20 of course extends along the time axis Y of the delay line with the curvature pattern shown in FIG. 3 extending along the phase axis X. Thus, the signal $E_2$ derived from antenna element B is fed into its corresponding delay line 17 having $OX_B$ (FIG. 3, part A), as its phase axis and along which the phase varies linearly as established by the phase modulated light beam 10 emergent from modulator 11. The phase difference between level $B_1$ and level $B_2$ in FIG. 3, part A, corresponds to the maximum value of Equation 1, or $2\pi d_1/\lambda$. The scale plotted along $OX_B$ is the cosine scale giving the phase corresponding to Equation 1 for any value of $\theta$ between 0° and 90°. This of course may be only a portion of the full X-axis of the delay line 17 which would preferably cover a range of 0° to 360°. The light emergent from delay line 17 is refracted by element 20 as shown in dotted lines in FIG. 3, part A, to convert the cosine scale to a linear scale MN. This MN scale corresponds with the direct light output scale of the delay line 17 of the phase scale modulator used for the output $E_1$ of antenna A selected as the origin for the antenna array.

The signal $E_3$ derived from antenna C is similarly processed. The phase scale for this signal's phase scale modulator is plotted on the phase axis $OX_C$ in FIG. 3, part B, corresponding to phase axis X on the corresponding modulator 17 similarly as in FIG. 3, part A, except in this instance the scale is $\cos(\theta - \alpha)$. The scale shown is for $\alpha = 30°$. The refractor is not shown, but it would be similar in curvature to refractor 20 and it would be shifted along the scale. The phase difference between the levels $C_1$ and $C_2$ is the maximum value of Equation 2, or $2\pi d_2/\lambda$. The maximum phase will occur for a value of $\theta = 30°$ and will be zero for a value of 120°. This refractor utilized with the signal $E_3$ phase scale modulator converts the light output of its delay line 17 to the same linear phase scale MN as obtained for signals $E_1$ and $E_2$. If a more complex antenna array were employed utilizing additional receiving elements, it is apparent that the foregoing treatment would be applied to each signal obtained.

The purpose of the refractor 20 is to compensate optically for the physical array of the antenna elements. In the simple case, if the elements were all in a line so that $\alpha = 0$, the phase scale would simply be proportional to the distance $d$ from a given antenna element to the origin of the antenna array. In such instance this optical compensation could be accomplished by making the optical system phase scale for each element proportional to the distance of the element from the antenna origin, as by selection of the degree of expansion of the light beam emergent from delay line 11. It will be apparent that this means could be used if desired to convert the phase scale for signals received at antenna element B of FIG. 1 to the linear scale MN, since $\alpha = 0$ for this element.

Having thus obtained for each of the antenna signals $E_1$, $E_2$ and $E_3$ a light signal modulated in relation to signal phase, and having converted the phase scale of each such light signal to a common linear scale, the target bearing $\theta$ can be determined by optically superposing these three modulated light signals. The position on the converted phase scale corresponding to the particular target bearing $\theta$, constitutes the position of maximum modulation and these positions register for the superposed modulated light signals. Therefore correlating this summed result with one of the signals E, maximum correlation occurs at that position along the phase axis which corresponds to said position of maximum modulation. This position is directly readable as target angle $\theta$. This operation is depicted in FIG. 4. In FIG. 4, the signal $E_1$ derived from antenna element A is applied to the blocks 10–18, and similarly, the signals $E_2$ and $E_3$ derived from antenna elements B and C are applied to respective blocks 10–20. Each of these three blocks includes all of the elements 10 through 18 of FIG. 1, and in addition the two blocks 10–20 include the respective light refractors 20 of FIG. 3. Thus, the light outputs of each of these three blocks, indicated in dotted lines, are the respective light signals of $E_1$, $E_2$ and $E_3$ modulated in relation to signal phase, and phase converted in the case of the two blocks 10–20. These three light signals are superimposed by a suitable optical system schematically represented by lens 21, and passed through the ultrasonic, solid, birefractive delay line 22. Since the phase scales for all the antenna elements A, B and C are identical in terms of $\theta$, the modulations of all three light beams add arithmetically at the point along the X-axis representative of angle $\theta$ for all targets in the direction $\theta$. For other targets, the signals at that point are out of phase with each other, and produce only a small resultant, but will of course add at a different point corresponding to a different angle $\theta$. Consequently, the intensity of the modulation received from any target along the scale MN is a maximum at that point on the scale corresponding to its bearing, and shows a pattern on either side corresponding to the directional pattern of the antenna system.

The purpose of the delay line modulator 22 is to render the modulation of the superposed light patterns visible. To this end, a portion of one of the received signals, $E_1$ for example, is coupled into the ultrasonic delay line 22 by means of electrosonic transducer 23, and thus caused to traverse the delay line 22 in the direction of arrow G to an absorber (not shown) along the side of line 22 opposite from the transducer 23. This direction of travel of the sonic wave derived from signal $E_1$ is transverse to the line of transmission of the superposed light outputs from blocks 10–18 and 10–20 through delay line 22. The direction G is parallel with the time axis Y in modulator delay line 17, and is in the same direction as the line of travel indicated by arrow F in delay line 17. Thus, the signal $E_1$ applied to line 22 is correlated with the signals $E_1$, $E_2$, and $E_3$ applied to respective delay line 17, thereby producing a visible light pattern output on line 22, which is indicated by the line 24 designating by its location along the MN scale or angle axis X the bearing $\theta$ of the particular target. This output signal may be read off the delay line 22 by a photosensitive means if desired, if further processing of the signal is sought.

The light output pattern of delay line 22 is in the form of a line 24 (or a plurality of parallel lines if more than one target is involved at different angles $\theta$) because the sonic waves in delay line 22 are traveling in the same direction as and parallel with the sonic waves in the delay lines 17. However, if the modulator delay line 22 is reversed in position, as shown in FIG. 5 as delay line 22', with the electrosonic transducer 23' on top, then the sonic waves coupled into the line 22' travel downwardly in the direction of arrow G' to an absorber, not shown. In this instance the electrical input to transducer 23' is indicated as $E_0$, which is a portion of the transmitted signal derived directly therefrom. When the light output from lens 21' is applied to delay line 22', correlation occurs only at one point along the delay axis Y, namely at that point on this axis of the delay line where the modulated light representative of the echo signal passes the corresponding sonic waveform of the transmitted signal in the line 22'. It should be noted that the modulated light representation of the echo signal is moving in the direction F (FIG. 2) which is directly opposite to the direction of movement G' of the sonic energy in line 22'. As a result, the light line output of delay line 22 in FIG. 4 becomes a light spot output 24' on line 22' of FIG. 5. Thus, the position of the spot 24' along the angle axis X (or along the line MN) is a measure of target bearing, and its position along the delay axis Y is a measure of target range. If there be more than one target within the reception range of the antenna system, then a corresponding number of light spots will appear on delay line 22', each located on X and Y coordinates in accordance with the bearing and range of the respective target.

It will be appreciated that the collimated beam of phase modulated light obtained in FIG. 2 passes serially through the delay line 17 of FIG. 2, the optical refractor 20 of FIG. 3 when a refractor is utilized, and lens 21 and delay line 22 of FIG. 4 or lens 21' and delay line 22' of FIG. 5. As is well understood in the art, ultrasonic delay line modulation of light is dependent upon the use of polarized light at the input, and the use of a polarized light analyzer to detect the effect of the delay line on the light passing therethrough. Such details have been omitted from the present description and drawings in order not to encumber the showing unnecessarily. To provide the necessary polarizing effects one may use a first polarizer to polarize the light input and a second polarizer oriented at 90° relative to the first for detecting the effect of the delay line on the light passing therethrough.

From the foregoing description it will be appreciated that the present invention relates to the electro-optical processing of information, particularly by the technique of ultrasonic delay line modulation of light. The invention includes in this processing the analysis of information on the basis of signal phase. It also includes the analysis of information by additively combining related signals by the superposition of a plurality of signals modulated light patterns. In addition, the invention includes the optical presentation of the analyzed information in two dimensional display wherein each of the two axes is definitive of a different aspect of the information processed, and particularly wherein one information aspect is embodied in a signal phase analysis expressed along one dimension of the display, and the other information aspect is embodied in a different signal parameter, such as time or delay, expressed along the other dimension of the display. It will be appreciated that the principles of the present invention are applicable to other environments than radar, and adapting the invention to the requirements of different environments will be apparent to those skilled in the art. In its adaptation to radar, it will be appreciated that the references herein to an antenna element is intended to include an input or output port, wherein a complex antenna array is combined into a single electrical output. The various features of the invention may obviously be applied to an antenna system employing a plurality of such posts. Further it is apparent that numerous modifications can be made in the system as herein described. Accordingly such adaptations and modifications as are embraced by the spirit and scope of the appended claims are contemplated as within the purview of this invention.

What is claimed is:

1. A correlator, comprising a plurality of light modulators for generating respective beams of light each intensity modulated in accordance with signals applied to each of said modulators, means for superimposing the modulated beams of light from each of said light modulators, and means for correlating the superimposed beams of light with a signal to detect the presence of a superimposed optical registry of the latter signal in said plurality of light modulators.

2. A correlator as set forth in claim 1, wherein said correlating means is an additional light modulating means.

3. A correlator as set forth in claim 1, wherein the light beam for each light modulator is additionally modulated along one axis in accordance with one parameter of information, whereby the position of correlation along said axis in said correlating means is denotative of information related to said one parameter of information.

4. A correlator as set forth in claim 3, with said correlator related to said modulator to provide an additional parameter of information by the position of correlation along a second axis.

5. A correlator as set forth in claim 4, wherein said correlating means is an additional light modulating means.

6. A correlator as set forth in claim 3, wherein the additional light beam modulation is a phase modulation.

7. A correlator for processing radar information on the basis of signals received from a target at an antenna array of a plurality of antenna elements: comprising a plurality of light modulators, each light modulator including a solid, birefractive, transparent ultrasonic delay line panel, a transducer for coupling a signal derived from a respective antenna element into said panel and causing said signal to travel along one axis of said panel and means for applying a light beam through said panel whereby said beam is modulated by the signal traveling along said panel, said light beam being further modulated in phase along an axis transverse to the direction of said one axis; means for superimposing the modulated light beams from said light modulators; means for compensating optically along said transverse axis for the phase differences between signals derived from different antenna elements as a result of the physical array of elements; and means for correlating the superimposed modulated light beams with a signal having a waveform similar to the received signal; the position of correlation along said transverse axis being denotative of target bearing.

8. A correlator as set forth in claim 7, wherein said correlating means is a solid, birefractive, transparent, ultrasonic delay line panel having a transducer for coupling a signal therein and causing it to travel along said panel in a direction opposite from the direction of travel of the signals coupled into the first mentioned light modulators, the signal coupled into the last-mentioned panel being derived from a transmitted radar signal, whereby the position of correlation along said one axis is denotative of target range.

9. A correlator as set forth in claim 7, wherein said optical compensating means includes means for refracting the light outputs of at least a portion of the light modulators.

10. A correlator as set forth in claim 9, wherein said refracting means effects at least in part a change in phase scale of the phase modulated light beam along said transverse axis.

11. A correlator as set forth in claim 7, wherein said optical compensating means includes means for effecting different phase scales for the phase modulated modulator light beams for at least a portion of the light modulators.

12. A method of analyzing information, comprising modulating a plurality of light beams with signals denotative of a parameter of information, superimposing said modulated light beams, and optically correlating said superimposed light beams with a signal, the occurrence of a correlation output denoting the superpositioning of similar modulations in said light beams.

References Cited

UNITED STATES PATENTS

| | | | |
|---|---|---|---|
| 2,418,964 | 4/1947 | Arenberg | 343—100.7 |
| 2,943,315 | 6/1960 | Rosenthal | 235—181 |
| 3,088,113 | 4/1963 | Rosenthal | 235—181 X |
| 3,171,126 | 2/1965 | Wiley | 343—100 X |
| 3,189,746 | 6/1965 | Slobodin et al. | 250—237 X |
| 3,205,495 | 9/1965 | Wilmotte | 235—181 X |

MALCOLM A. MORRISON, Primary Examiner

JOSEPH F. RUGGIERO, Assistant Examiner

U.S. Cl. X.R.

340—146.3